(12) United States Patent
Higuchi et al.

(10) Patent No.: US 9,448,136 B2
(45) Date of Patent: Sep. 20, 2016

(54) SENSOR CONTROL APPARATUS, SENSOR CONTROL SYSTEM, AND SENSOR CONTROL METHOD

(71) Applicant: NGK SPARK PLUG CO., LTD., Nagoya-shi, Aichi (JP)

(72) Inventors: Yuzo Higuchi, Komaki (JP); Hiroshi Inagaki, Komak (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 263 days.

(21) Appl. No.: 14/224,154

(22) Filed: Mar. 25, 2014

(65) Prior Publication Data

US 2014/0290347 A1    Oct. 2, 2014

(30) Foreign Application Priority Data

Mar. 27, 2013  (JP) ................................ 2013-066737

(51) Int. Cl.
*G01M 15/10*    (2006.01)
*F01N 11/00*    (2006.01)

(52) U.S. Cl.
CPC .................................. *G01M 15/106* (2013.01)

(58) Field of Classification Search
CPC ............................. G01M 15/10; F01N 11/00
USPC ..................................................... 73/114.71
See application file for complete search history.

(56) References Cited

U.S. PATENT DOCUMENTS

| | | | |
|---|---|---|---|
| 4,974,563 A * | 12/1990 | Ikeda ................... | F02D 41/105 123/480 |
| 5,249,453 A | 10/1993 | Usami et al. | |
| 5,528,898 A | 6/1996 | Nakayama et al. | |
| 2002/0014103 A1 | 2/2002 | Matsubara et al. | |
| 2006/0236677 A1 * | 10/2006 | Inagaki ................. | F01N 3/0821 60/276 |
| 2008/0196490 A1 * | 8/2008 | Fukagai .............. | F02D 41/1456 73/114.72 |
| 2009/0084172 A1 * | 4/2009 | Fukagai .............. | F02D 41/1456 73/114.72 |

(Continued)

FOREIGN PATENT DOCUMENTS

| | | | | |
|---|---|---|---|---|
| GB | 2087596 A | * | 5/1982 | ......... G05D 16/2093 |
| JP | 4-204246 A | | 7/1992 | |

(Continued)

OTHER PUBLICATIONS

Communication dated Jul. 14, 2015 from the Japanese Patent Office in counterpart application No. 2013-066737.

*Primary Examiner* — Lisa Caputo
*Assistant Examiner* — Jamel Williams
(74) *Attorney, Agent, or Firm* — Sughrue Mion, PLLC (57) ABSTRACT

A sensor control apparatus which receives from a gas sensor (10) a sensor output signal Ip corresponding to the concentration of a specific gas component, and a pressure signal P output from a pressure sensor (20). The sensor control apparatus includes a computation section (38) which computes a specific component concentration which is corrected based on the pressure signal P so as to eliminate the influence of the pressure of the gas. The sensor control apparatus includes response adjustment sections (34) and (36) for adjusting the response rates of the sensor output signal Ip and the pressure signal P before being input to the computation section (38), the response rate exhibiting a time variation of the corresponding signal to a change in the pressure of the gas, such that the response rate of the sensor output signal Ip or the response rate of the pressure signal P, whichever is faster, approaches the slower of the two.

4 Claims, 8 Drawing Sheets

(56) References Cited

U.S. PATENT DOCUMENTS

| | | | |
|---|---|---|---|
| 2011/0166816 A1* | 7/2011 | Ishiguro | F02D 41/123 702/104 |
| 2012/0325662 A1* | 12/2012 | Inagaki | G01N 27/409 204/435 |
| 2013/0131997 A1* | 5/2013 | Inagaki | G01M 15/042 702/24 |

FOREIGN PATENT DOCUMENTS

| | | | |
|---|---|---|---|
| JP | 04204246 A | * | 7/1992 |
| JP | 6-273381 A | | 9/1994 |
| JP | 8-100637 A | | 4/1996 |
| JP | 2002-39010 A | | 2/2002 |
| JP | 2005-61420 A | | 3/2005 |
| JP | 2010-255479 A | | 11/2010 |

* cited by examiner

SENSOR CONTROL APPARATUS, SENSOR CONTROL SYSTEM, AND SENSOR CONTROL METHOD

BACKGROUND OF THE INVENTION

1. Field of the Invention

The present invention relates to a sensor control apparatus, a sensor control system, and a sensor control method.

2. Description of the Related Art

For internal combustion engines such as a diesel engine and a gasoline engine, it is common to control a mixture ratio (i.e., a ratio of gas to fuel which is supplied to each combustion chamber) in order to reduce fuel consumption and purify exhaust gas. In order to control the mixture ratio, a gas sensor is used to measure the proportion of a specific gas component (e.g., oxygen) contained in intake gas or the proportion of a specific gas component contained in exhaust gas.

The gas sensor includes a sensor element disposed in a gas which is a target for measurement (hereinafter referred to as an object gas). The sensor element outputs a value representing the concentration of a specific gas component (e.g., oxygen concentration), which is the proportion of the specific gas component. However, the value output from the sensor element is known to be affected not only by the concentration of the specific gas component of the object gas but also by the pressure of the object gas.

In recent years, since the degree of fineness of control of an internal combustion engine has increased, there is an increasing need for measuring the concentration of a specific gas component more accurately. In order to measure the concentration of a specific gas component of an object gas more accurately, various methods have been proposed for eliminating the influence of the gas pressure on the value output from the gas sensor (see, for example, Patent Documents 1 and 2).

Patent Documents 1 and 2 disclose a configuration including a sensor element which measures the concentration of a specific gas component of an object gas and a pressure sensor which measures the pressure of the object gas. In addition, Patent Documents 1 and 2 have proposed a method (correction method) for eliminating the influence of the gas pressure on the value which is output from the gas sensor and which represents the concentration of the specific gas component. In this method, the value output from the gas sensor is multiplied by a coefficient based on the pressure measured by the pressure sensor, whereby the influence of the gas pressure on the output value is eliminated.

[Patent Document 1] Japanese Patent Application Laid-Open (kokai) No. H6-273381

[Patent Document 2] Japanese Patent Application Laid-Open (kokai) No. 2005-061420

Problems to be Solved by the Invention

Through use of the correction method described in the above-described Patent Documents 1 and 2, the accuracy of the value representing the concentration of the specific gas component can be improved as compared with the case where the value output from a gas sensor and representing the concentration of the specific gas component is not corrected. However, the degree of fineness of control of an internal combustion engine is expected to increase in the future. As a result, there will be an increasing need for obtaining a value representing the concentration of the specific gas component more accurately. That is, the correction method described in the above-described Patent Documents 1 and 2 is problematic in that the method encounters difficulty in obtaining a value which represents the concentration of the specific gas component with a required accuracy.

Specifically, in the case where the pressure of an object gas changes sharply as a result of, for example, opening or closing of a valve disposed in a flow passage through which the object gas flows, the above-described correction method has a problem in that a period of time is generated during which the value output from the gas sensor cannot be corrected appropriately. Namely, a period of time may be generated during which the concentration of a specific gas component cannot be corrected appropriately because correction thereof cannot satisfactorily follow the rate of change in the pressure of the object gas.

Even in such a case, the correction can follow the changed pressure after lapse of a predetermine time, whereby the concentration of the specific gas component can be corrected appropriately. However, if the pressure of the object gas sharply changes again before the correction follows the changed pressure, a period of time is again generated during which the concentration of the specific gas component cannot be corrected appropriately. As a result, the above-described correction method encounters greater difficulty in obtaining a value which represents the concentration of the specific gas component with a required accuracy.

SUMMARY OF THE INVENTION

The present invention has been made to solve the above-described problems, and an object thereof is to provide a sensor control apparatus, a sensor control system, and a sensor control method which can improve the accuracy of correction even in the case where the pressure of an object gas changes dynamically.

The above object in accordance with a first aspect (1) of the present invention has been achieved by providing a sensor control apparatus including a computation section which receives from a gas sensor a sensor output signal corresponding to the concentration of a specific gas component contained in a gas flowing through a flow passage provided in an internal combustion engine, and a pressure signal output from a pressure sensor which measures the pressure of the gas, the computation section computing a specific component concentration which represents the concentration of the specific gas component and is corrected based on the pressure signal in order to eliminate an influence of the pressure of the gas on the sensor output signal. The sensor control apparatus comprises a response adjustment section which adjusts a response rate of at least one of the sensor output signal and the pressure signal before being input to the computation section, the response rate exhibiting a time variation of the corresponding signal to a change in the pressure of the gas, such that the response rate of the sensor output signal or the response rate of the pressure signal, whichever is faster, approaches the slower of the response rate of the sensor output signal and the response rate of the pressure signal.

According to the sensor control apparatus of the present invention, the response adjustment section reduces the difference in response rate between the sensor output signal and the pressure signal input to the computation section. Therefore, it becomes easier to eliminate the influence of a dynamic change in the gas pressure on the sensor output signal. In general, the gas sensor and the pressure sensor often differ from each other in terms of behavior toward a dynamic change in the gas pressure (e.g., rate of response of the corresponding signal (the sensor output signal or the pressure signal) to a change in the gas pressure). Therefore, in the case where the output signals of the gas sensor and the pressure sensor are directly input to the computation section, a situation arises in which the computation section receives from these sensors respective signals whose responses change to different degrees, depending on the change in the gas pressure. In such a situation, the computation section cannot perform an appropriate correction, thereby failing to improve the accuracy in correcting the specific component concentration.

In contrast, in the case where the sensor output signal and the pressure signal are adjusted before being input to the computation section such that the response rate of the sensor output signal or the response rate of the pressure signal, whichever is faster, approaches the slower of the two, the difference in degree of response between the sensor output signal and the pressure signal decrease. As a result, the computation section can perform an appropriate correction more easily, thereby making it easier to improve the accuracy in correcting the specific component concentration. The greater the degree to which the difference in response rate between the two signals is reduced, the higher the correction accuracy.

In a preferred embodiment (2), the above sensor control apparatus (1) further comprises a delay adjustment section which adjusts a delay time of at least one of the sensor output signal and the pressure signal before being input to the computation section, the delay time being a time between a point at which the pressure of the gas changes and a point at which the corresponding signal begins to respond to the change in the pressure, such that the delay time of the sensor output signal or the delay time of the pressure signal, whichever is shorter, approaches the longer of delay time of the sensor output signal and the delay time of the pressure signal.

Since the delay adjustment section reduces the difference in delay time between the sensor output signal and the pressure signal input to the computation section, it becomes easier to eliminate the influence of a dynamic change in the gas pressure on the sensor output signal. In general, the gas sensor and the pressure sensor often differ from each other in terms of delay time which is the time between a point at which the pressure of the gas changes and a point at which the corresponding signal (the sensor output signal or the pressure signal) begins to respond to the change. Therefore, in the case where the output signals of the gas sensor and the pressure sensor are directly input to the computation section, a situation arises where a signal which has changed in value with the change in the pressure is input to the computation section along with a signal which has not changed in value with the change in the pressure. In such a situation, the computation section cannot perform an appropriate correction, thereby failing to improve the accuracy in correcting the specific component concentration.

In contrast, in the case where the sensor output signal and the pressure signal are adjusted before being input to the computation section such that the delay time of the sensor output signal or the delay time of the pressure signal, whichever is shorter, approaches the longer of the two, the period is shortened during which a signal which has changed in value with a change in pressure is input to the computation section along with a signal which has not changed in value with the change in pressure. As a result, the computation section can perform an appropriate correction more easily, thereby making it easier to improve the accuracy in correcting the specific component concentration. The greater the degree to which the difference in delay time between the two signals is reduced, the higher the correction accuracy.

In a second aspect (3), the present invention provides a sensor control system comprising a gas sensor which outputs an output value corresponding to the concentration of a specific gas component contained in a gas flowing through a flow passage provided in an internal combustion engine; a pressure sensor which measures the pressure of the gas; and the sensor control apparatus (1) or (2) above.

Since the above-described sensor control apparatus (1) or (2) is part of the sensor control system (3) of the present invention, even when the pressure of an object gas changes dynamically, the accuracy in correcting the specific component concentration can be easily improved.

In a third aspect (4), the present invention provides a sensor control method which comprises obtaining from a gas sensor a sensor output signal corresponding to the concentration of a specific gas component contained in a gas flowing through a flow passage provided in an internal combustion engine, and a pressure signal output from a pressure sensor which measures the pressure of the gas; adjusting a response rate of at least one of the sensor output signal and the pressure signal, the response rate exhibiting a time variation of the corresponding signal to a change in the pressure of the gas, such that the response rate of the sensor output signal or the response rate of the pressure signal, whichever is faster, approaches the slower one of the response rate of the sensor output and the response rate of the pressure signal; and computing a specific component concentration which represents the concentration of the specific gas component based on the adjusted sensor output signal and the adjusted pressure signal such that the specific component concentration is corrected on the basis of the pressure signal in order to eliminate an influence of the pressure of the gas on the sensor output signal.

According to the sensor control method (4) of the present invention, the process of reducing the difference in response rate between the sensor output signal and the pressure signal used in the computation step is performed in the response adjustment step. Therefore, it becomes easier to eliminate the influence of a dynamic change in the gas pressure on the sensor output signal.

In a preferred embodiment (5), the above sensor control method further comprises adjusting a delay time of at least one of the sensor output signal and the pressure signal, which adjusting step is performed between the obtaining step and the computing step, the delay time being a time between a point at which the pressure of the gas changes and a point at which the corresponding signal begins to respond to the change in the pressure, such that the delay time of the sensor output signal or the delay time of the pressure signal, whichever is shorter, approaches the longer of the delay time of the sensor output signal and the delay time of the pressure signal.

Since the processing of reducing the difference in delay time between the sensor output signal and the pressure signal used in the computation step is performed in the delay adjustment step, it becomes easier to eliminate the influence of a dynamic change in the gas pressure on the sensor output signal.

Effect of the Invention

According to the sensor control apparatus, the sensor control system, and the sensor control method of the present invention, the response adjustment section reduces the difference in response rate between the sensor output signal and the pressure signal input to the computation section. Therefore, it becomes easier to eliminate the influence of a dynamic change in the gas pressure on the sensor output signal. Thus, the sensor control apparatus, the sensor control system, and the sensor control method of the present invention achieve an effect of improving the correction accuracy even when the pressure of the object gas changes dynamically.

DESCRIPTION OF REFERENCE NUMERALS

Reference numerals used to identify various features in the drawings include the following.
1: sensor control system
10: oxygen sensor (gas sensor)
20: pressure sensor
30: Engine control unit (sensor control apparatus)
34: first response adjustment section
35: first delay adjustment section
36: second response adjustment section
37: second delay adjustment section
38: computation section
40: internal combustion engine
S11, S13: obtainment step
S12, S14: response adjustment step, delay adjustment step
S15: computation step
Ip: pump current signal (sensor output signal)
P: pressure signal

DETAILED DESCRIPTION OF THE PREFERRED EMBODIMENTS

A sensor control system 1 according to one embodiment of the present invention will now be described with reference to FIGS. 1 to 9. However, the present invention should not be construed as being limited thereto. First, the sensor control system 1 will be described with reference to FIG. 1 which is a schematic diagram showing the configuration of the sensor control system 1 according to the present embodiment.

Figure 1:
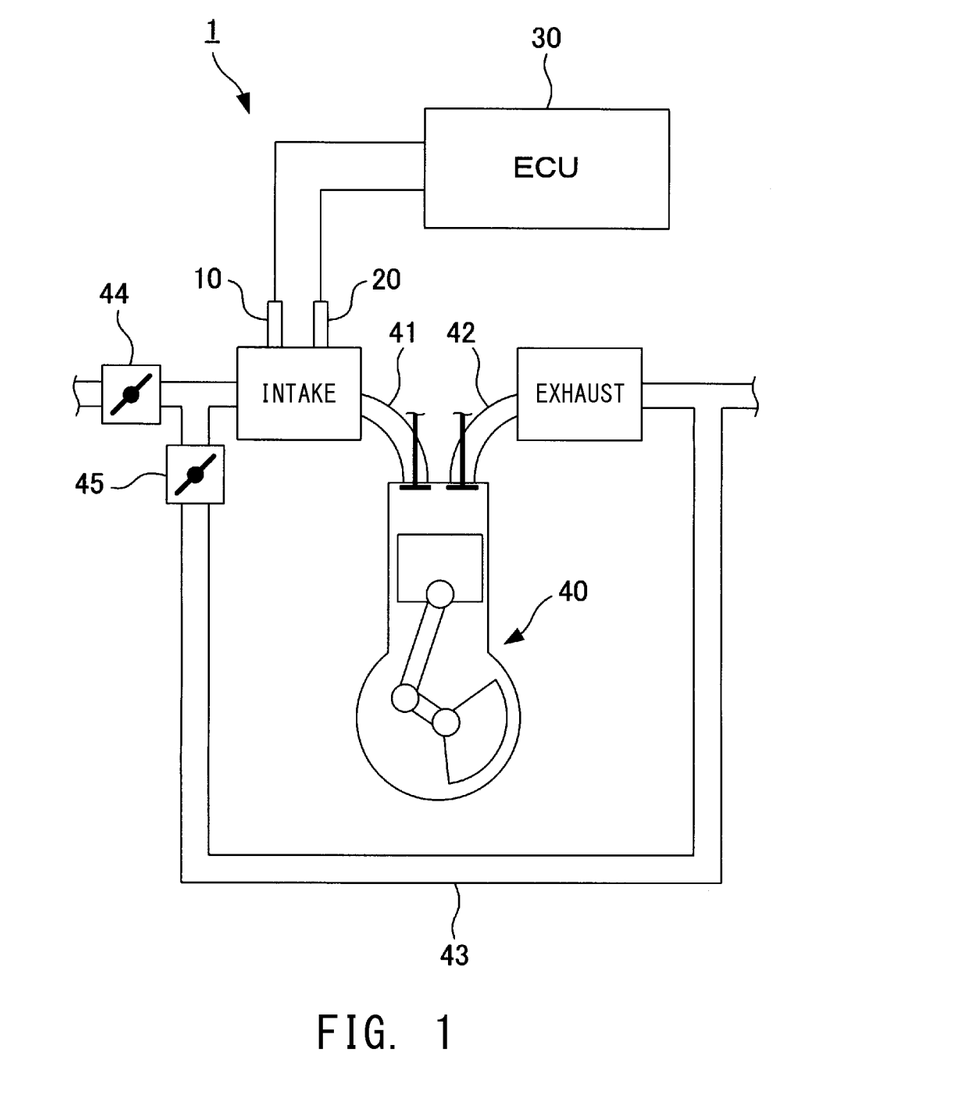
FIG. 1 is a schematic diagram showing the configuration of a sensor system according to the present embodiment.

As shown in FIG. 1, the sensor control system 1 measures the concentration of oxygen (specific gas component) contained in the intake gas which is taken into an internal combustion engine 40. The oxygen concentration (specific component concentration) measured by the sensor control system 1 is used to control the internal combustion engine 40; for example, it is used to control an air-fuel ratio. The sensor control system 1 is mainly composed of an oxygen sensor (gas sensor) 10, a pressure sensor 20, and an engine control unit 30 (hereinafter referred to as an "ECU 30") which also serves as a sensor control apparatus.

Notably, in the present embodiment, the sensor control system 1 of the present invention is used to measure the concentration of oxygen contained in the intake gas which is taken into the internal combustion engine 40; however, the sensor control system 1 of the present invention may be used to measure the concentration of oxygen contained in the exhaust gas which is discharged from the internal combustion engine 40, and no particular limitation is imposed on the object gas. However, since the pressure of the intake gas changes greatly as compared with the exhaust gas, the output value of the oxygen sensor 10, described below, is likely to be in error relative to the actual concentration of $O_2$. Therefore, use of the sensor control system 1 of the present invention for the intake gas makes the effect of improving the correction accuracy more remarkable.

The oxygen sensor 10 and the pressure sensor 20 are disposed in an intake pipe 41 of the internal combustion engine 40. Specifically, the oxygen sensor 10 and the pressure sensor 20 are disposed on the internal combustion engine 40 side in relation to a junction point where the intake pipe 41 and an exhaust gas recirculation pipe 43 (hereinafter referred to as an "EGR pipe 43") are connected together; namely, these sensors are disposed downstream of the junction point. Meanwhile, an intake valve 44 for controlling the flow rate of air flowing through the intake pipe 41 is disposed in the intake pipe 41 at a position upstream of the positions at which the oxygen sensor 10 and the pressure sensor 20 are disposed therein.

The EGR pipe 43 connects an exhaust pipe 42 and the intake pipe 41 so as to lead a portion of the exhaust gas flowing through the exhaust pipe 42 to the intake pipe 41; namely, the EGR pipe 43 is provided to recirculate the exhaust gas. The EGR pipe 43 has a control valve 45 for controlling the recirculation amount of the exhaust gas.

The pressure sensor 20 is disposed at a position close to the oxygen sensor 10. The position close to the oxygen sensor 10 refers to a position in an area where the pressure of the intake gas changes in much the same way as that of the intake gas whose oxygen concentration is measured by the oxygen sensor 10. In the present embodiment, both the oxygen sensor 10 and the pressure sensor 20 are disposed at the positions downstream of the junction point where the intake pipe 41 and the exhaust gas recirculation pipe 43 meet. However, only the pressure sensor 20 may be disposed at a position upstream of the above-described junction point as long as this position is close to the position of the oxygen sensor 10.

In addition, no particular limitation is imposed on the relative positions of the oxygen sensor 10 and the pressure sensor 20; that is, the oxygen sensor 10 may be disposed upstream of the pressure sensor 20, or the pressure sensor 20 may be disposed upstream of the oxygen sensor 10. In addition, as described in the present embodiment, the oxygen sensor 10 and the pressure sensor 20 may be accommodated in different enclosures which are separately attached to the intake pipe 41. Alternatively, the oxygen sensor 10 and the pressure sensor 20 may be accommodated in a common enclosure, or the oxygen sensor 10 and the pressure sensor 20 may be incorporated in a single element.

The oxygen sensor 10 measures the concentration of oxygen contained in the intake gas flowing through the intake pipe 41, and outputs a pump current which is a sensor output signal corresponding to the oxygen concentration. The value of the pump current linearly changes with the concentration of oxygen contained in the intake gas as well as the pressure of the intake gas which flows through the intake pipe 41 and which surrounds the oxygen sensor 10. Notably, no particular limitation is imposed on the type, etc., of the oxygen sensor 10, so long as it is a commonly-known sensor having the above-described characteristic.

The pressure sensor 20 measures the pressure of the intake gas flowing through the intake pipe 41 so as to output a sensor output signal corresponding to the pressure of the intake gas. Notably, a commonly-known pressure sensor may be used as the pressure sensor 20; that is, no particular limitation is imposed on the type, etc., of the pressure sensor 20.

Figure 2:
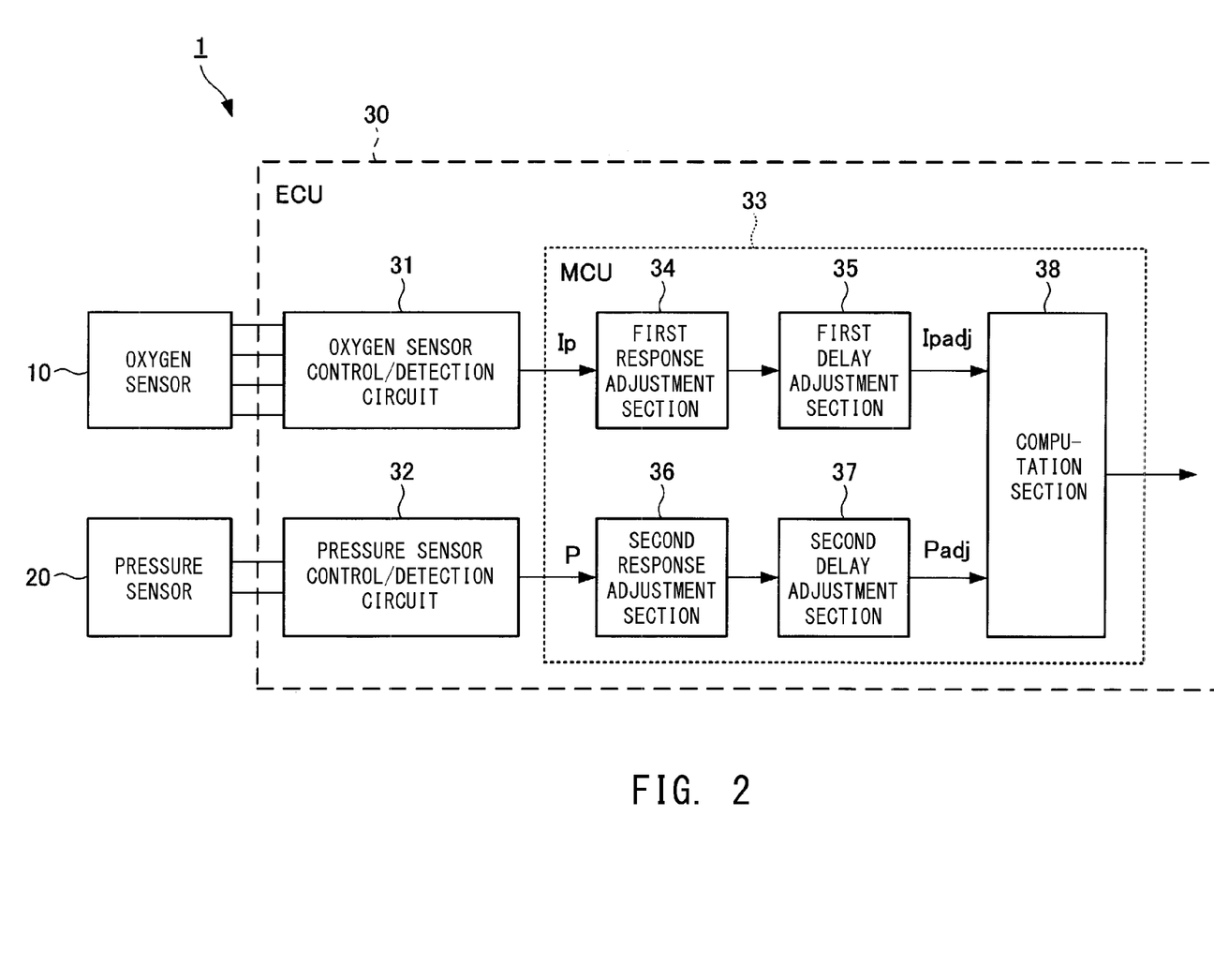
FIG. 2 is a block diagram showing the configuration of the ECU shown in FIG. 1.

The ECU 30 obtains, through computation, the oxygen concentration of the intake gas flowing through the intake pipe 41 based on the sensor output signal from the oxygen sensor 10 and the sensor output signal from the pressure sensor 20. The ECU 30 controls the operation state of the internal combustion engine 40 based on at least the obtained oxygen concentration. As shown in FIG. 2, the ECU 30 is mainly composed of an oxygen sensor control/detection circuit 31, a pressure sensor control/detection circuit 32, and a microcontrol unit 33 (hereinafter referred to an "MCU 33"). In addition, the ECU 30 includes a control section (unillustrated) which controls the internal combustion engine 40 based on the oxygen concentration computed by the MCU 33.

Notably, in the present embodiment, the oxygen sensor control/detection circuit 31 and the pressure sensor control/detection circuit 32 are incorporated in the ECU 30. However, the oxygen sensor control/detection circuit 31 may be incorporated in the oxygen sensor 10, and the pressure sensor control/detection circuit 32 may be incorporated in the pressure sensor 20. Alternatively, the oxygen sensor control/detection circuit 31 and the pressure sensor control/detection circuit 32 may be accommodated in a common enclosure which is provided separately from the ECU 30, and the oxygen sensor 10, the pressure sensor 20, and the ECU 30 are connected to the common enclosure.

The oxygen sensor control/detection circuit 31 controls measurement of the oxygen concentration performed by the oxygen sensor 10, and the pressure sensor control/detection circuit 32 controls measurement of pressure performed by the pressure sensor 20. In addition, the oxygen sensor control/detection circuit 31 detects the sensor output signal from the oxygen sensor 10, and the pressure sensor control/detection circuit 32 detects the sensor output signal from the pressure sensor 20. Upon detecting the sensor output signal from the oxygen sensor 10, the oxygen sensor control/detection circuit 31 outputs a pump current signal Ip corresponding to the detected sensor output signal. Upon detecting the sensor output signal from the pressure sensor 20, the pressure sensor control/detection circuit 32 outputs a pressure signal P corresponding to the detected sensor output signal. Notably, the types, etc., of the oxygen sensor control/detection circuit 31 and the pressure sensor control/detection circuit 32 are selected in accordance with the types, etc., of the oxygen sensor 10 and the pressure sensor 20, and no particular limitation is imposed on them.

The MCU 33 obtains, through computation, an oxygen concentration signal based on the pump current signal Ip output from the oxygen sensor control/detection circuit 31 and the pressure signal P output from the pressure sensor control/detection circuit 32. As shown in FIG. 2, the MCU 33 is mainly composed of a first response adjustment section 34 which adjusts the response rate of the pump current signal Ip; a first delay adjustment section 35 which adjusts the delay time of the pump current signal Ip; a second response adjustment section 36 which adjusts the response rate of the pressure signal P; a second delay adjustment section 37 which adjusts the delay time of the pressure signal P; and a computation section 38 which obtains, through computation, an oxygen concentration signal.

Figure 3A:
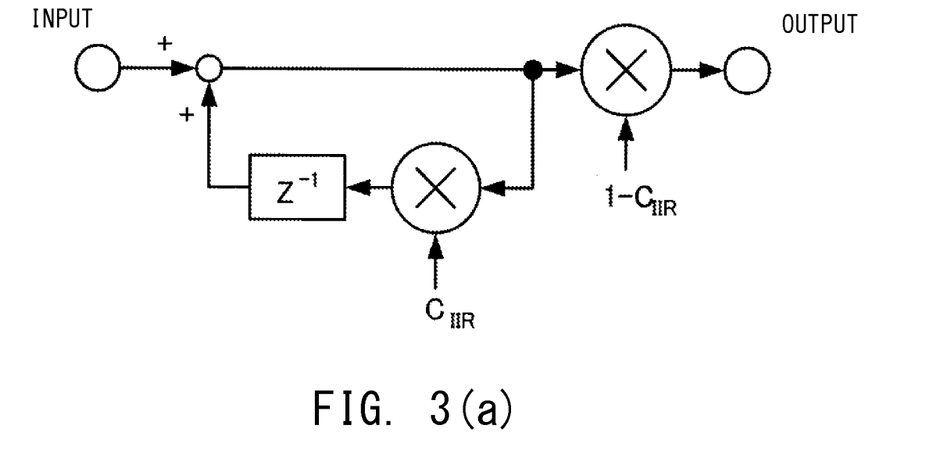
FIGS. 3(a) and 3(b) are diagrams showing the configurations of first and second response adjustment sections.

The first response adjustment section 34 and the second response adjustment section 36 adjust the rate of response of (the value of) the pump current signal Ip and the rate of response of (the value of) the pressure signal P, respectively, to a change in the intake gas pressure, particularly a sharp change in the pressure of the intake gas (in other words, so as to follow the change in the intake gas pressure). In the case where each of the first response adjustment section 34 and the second response adjustment section 36 is formed of a digital circuit, it is configured as shown in FIG. 3(a). In FIG. 3(a), $C_{IIR}$ represents a variable for response adjustment, and its value can be selected from values within a predetermined range. For example, in the case where 0 is selected as $C_{IIR}$ ($C_{IIR}=0$), the response rate of the input signal is not adjusted. $Z^{-1}$ represents a delay element which delays the signal input thereto by one sampling cycle.

In the present embodiment, the first response adjustment section 34 and the second response adjustment section 36 are used to adjust the maximum response frequency of the pressure sensor 20 to the maximum response frequency (e.g., 20 Hz) of the oxygen sensor 10. Since the maximum response frequency of the pressure sensor 20 is, in general, 100 Hz to 10 kHz, the second response adjustment section 36 performs the processing for decreasing the response rate of the pressure signal P. In contrast, the first response adjustment section 34 does not perform the processing for decreasing the response rate of the pump current signal Ip. Notably, IIR is an acronym for Infinite Impulse Response.

Figure 3B:
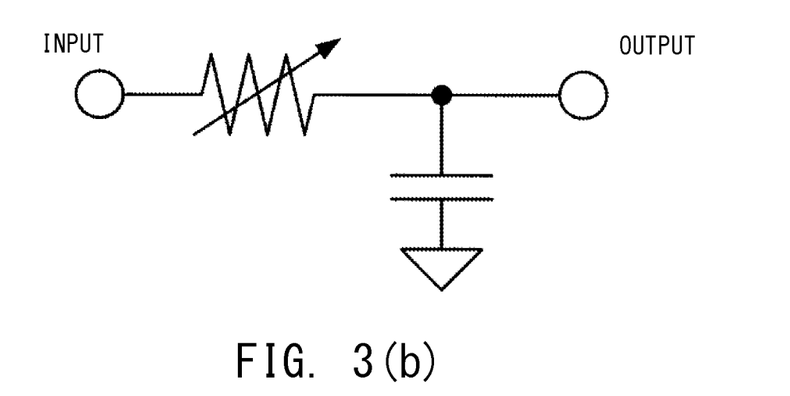

In the case where each of the first response adjustment section 34 and the second response adjustment section 36 is formed of an analog circuit, it is configured as shown in FIG. 3(b). In this case, response adjustment is made by changing the resistance of a resistor constituting the first response adjustment section 34 or the second response adjustment section 36. The resistance can be changed within a range of, for example, 10 kΩ to 1000 kΩ. In addition, the capacitance of a capacitor constituting the first response adjustment section 34 or the second response adjustment section 36 is fixed to, for example, 100 nF.

Notably, the response rate can also be described as, for example, a period from the moment the value of the pump current signal Ip or pressure signal P begins to change with a change in the pressure of the intake gas to the moment the change in the value of the pump current signal Ip or pressure signal P is saturated. Whether or not the change in the value of the pump current signal Ip or pressure signal P has been saturated can be determined, for example, by determining whether or not the signal value change rate per unit time has become equal to or less than a predetermined threshold value. Also, the response rate can be described as, for example, a period from the moment the value of the pump current signal Ip or pressure signal P begins to change with a change in the intake gas pressure to the moment a predetermined response ratio (e.g., 63%) is reached. Notably, the response ratio is 100% when the change in the value of the pump current signal Ip or pressure signal P has become stable.

Figure 4:
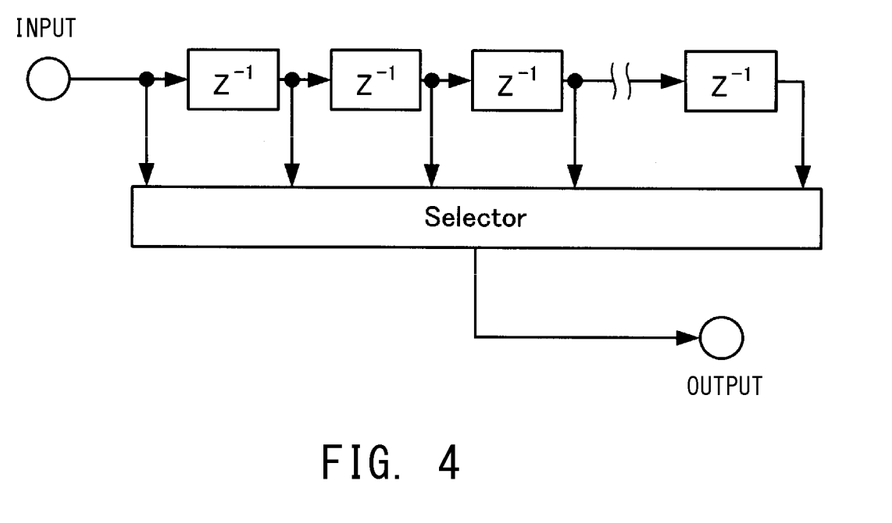
FIG. 4 is a diagram showing the configuration of the first and second delay adjustment sections.

The first delay adjustment section 35 adjusts a delay time which elapses before the pump current signal Ip begins to respond to a change in the pressure of the intake gas, particularly to a sharp change in the pressure of the intake gas. Meanwhile, the second delay adjustment section 37 adjusts a delay time that elapses before the pressure signal P begins to respond to a change in the pressure of the intake gas, particularly to a sharp change in the pressure of the intake gas. In other words, the delay time of the pump current signal Ip or the delay time of the pressure signal P, whichever is shorter, is adjusted to the longer of the two. Each of the first delay adjustment section 35 and the second delay adjustment section 37 is formed of a digital circuit, and is configured as shown in FIG. 4.

For example, the pump current signal Ip input to the first delay adjustment section 35 at a certain sampling timing is stored in the leftmost delay element $Z^{-1}$ at the sampling timing subsequent thereto. Further, at the sampling timing subsequent thereto, the pump current signal Ip is moved from the leftmost delay element $Z^{-1}$ to the delay element $Z^{-1}$ located to the right of the leftmost delay element $Z^{-1}$. At that time, the pump current signal Ip which has been obtained at the sampling timing preceding thereto is stored in the leftmost delay element $Z^{-1}$. The above-described processing is performed each time sampling takes place. A selector selects the pump current signal Ip to be output from the first delay adjustment section 35. In other words, the selector selects among a plurality of delay elements $Z^{-1}$ the delay element $Z^{-1}$ which stores the pump current signal Ip to be output.

In general, the above-described delay times change depending on the speeds of operation clocks and the amounts of processing of the oxygen sensor control/detection circuit 31 and the pressure sensor control/detection circuit 32. Accordingly, depending on the situation, the delay time of the pump current signal Ip may be longer than that of the pressure signal P, and the delay time of the pressure signal P is longer than that of the pump current signal Ip. In the present embodiment, the delay time of the pump current signal Ip is assumed to be shorter than that of the pressure signal P, and the pump current signal Ip is assumed to be delayed by two sampling cycles ($Z^{-2}$).

Notably, the pump current signal Ip whose response rate and delay time have been adjusted by the first response adjustment section 34 and the first delay adjustment section 35 will be referred to as an adjusted pump current signal Ipadj, and the pressure signal P whose response rate and delay time have been adjusted by the second response adjustment section 36 and the second delay adjustment section 37 will be referred to as an adjusted pressure signal Padj (see FIG. 2).

The computation section 38 obtains, through computation, an oxygen concentration signal by correcting for (eliminating) the influence of the intake gas pressure on the adjusted pump current signal Ipadj based on the adjusted pressure signal Padj. Notably, the computation method used by the computation section 38 in order to obtain the oxygen concentration signal will be described below.

Figure 5:
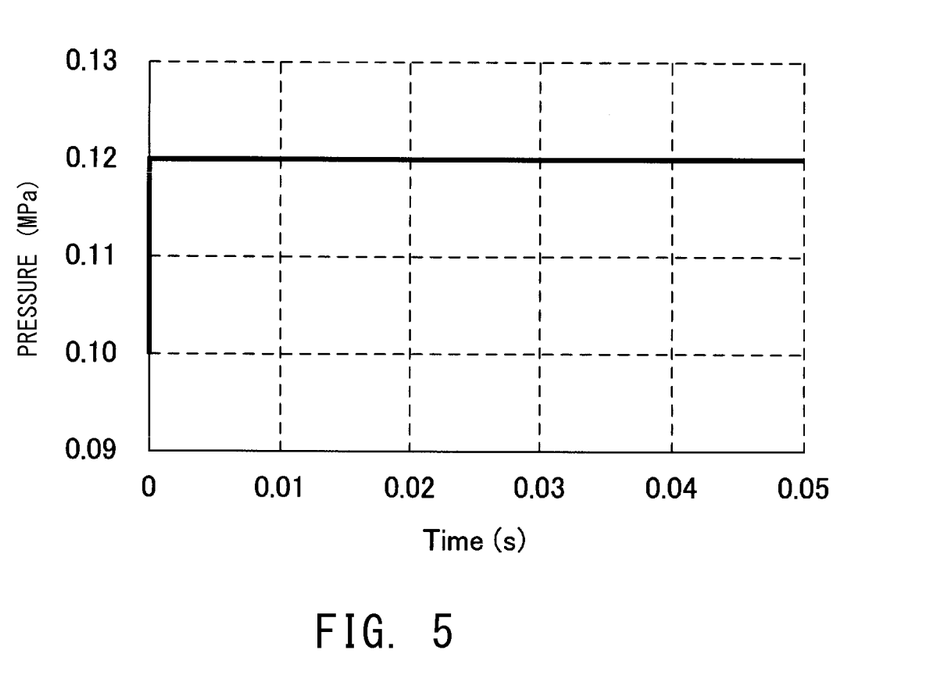
FIG. 5 is a graph showing a change in intake gas pressure.

Next, examples of the characteristics of the first response adjustment section 34, first delay adjustment section 35, second response adjustment section 36, and second delay adjustment section 37 will be described with reference to FIGS. 5 to 7(b). Here, a case will be described where the oxygen concentration of the intake gas is 16 vol %, and the intake gas pressure sharply changes in a stepwise fashion from 0.10 MPa to 0.12 MPa as shown in FIG. 5.

Figure 6A:
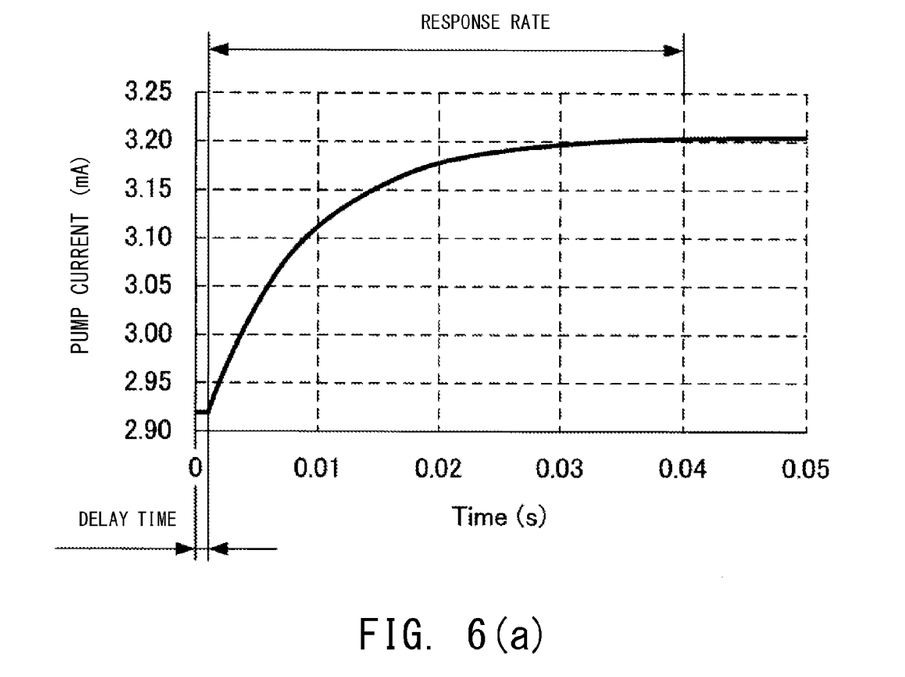
FIGS. 6(a) and 6(b) are graphs showing the waveforms of a pump current signal Ip and a pressure signal P which change with the pressure of an object gas.
Figure 6B:
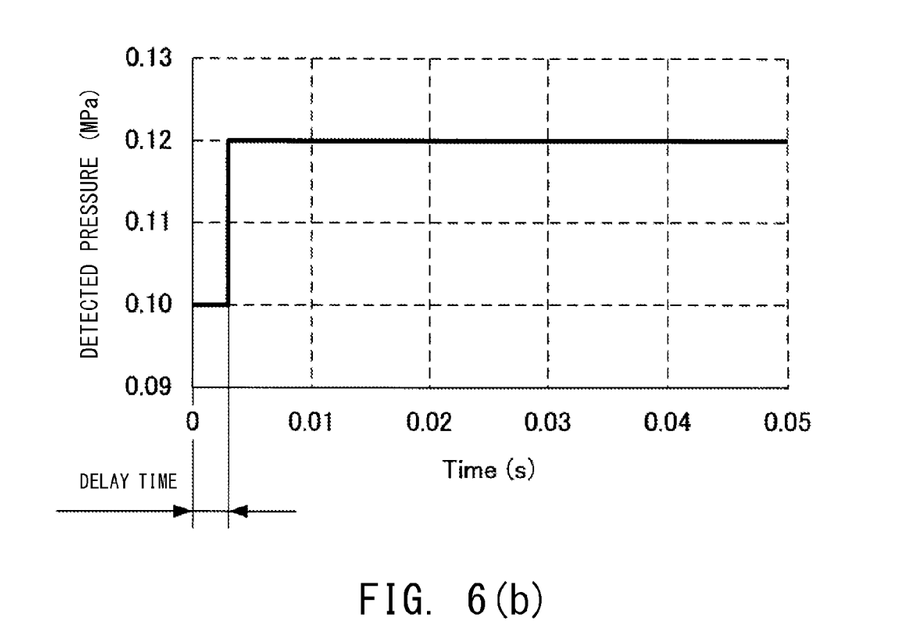

In this case, the pump current signal Ip output from the oxygen sensor 10 has, for example, a waveform shown in the graph of FIG. 6(a), and the pressure signal P output from the pressure sensor 20 has, for example, a waveform shown in the graph of FIG. 6(b). Notably, in each of these graphs, the horizontal axis is a time axis whose origin (0) corresponds to a point in time at which the intake gas pressure changes sharply.

When the pump current signal Ip is compared with the pressure signal P, there are two differences found between them. The first difference is that the point in time at which the pump current signal Ip begins to change with a change in the intake gas pressure is earlier than the point in time at which the pressure signal P begins to change with the change in the intake gas pressure. In other words, the delay time of the pump current signal Ip is different from that of the pressure signal P. The second difference is that the time required for the pressure signal P to reach a value corresponding to the changed intake gas pressure is shorter than the time required for the pump current signal Ip to reach a value corresponding to the changed intake gas pressure. In other words, the response rate of the pump current signal Ip is different from that of the pressure signal P.

Figure 7A:
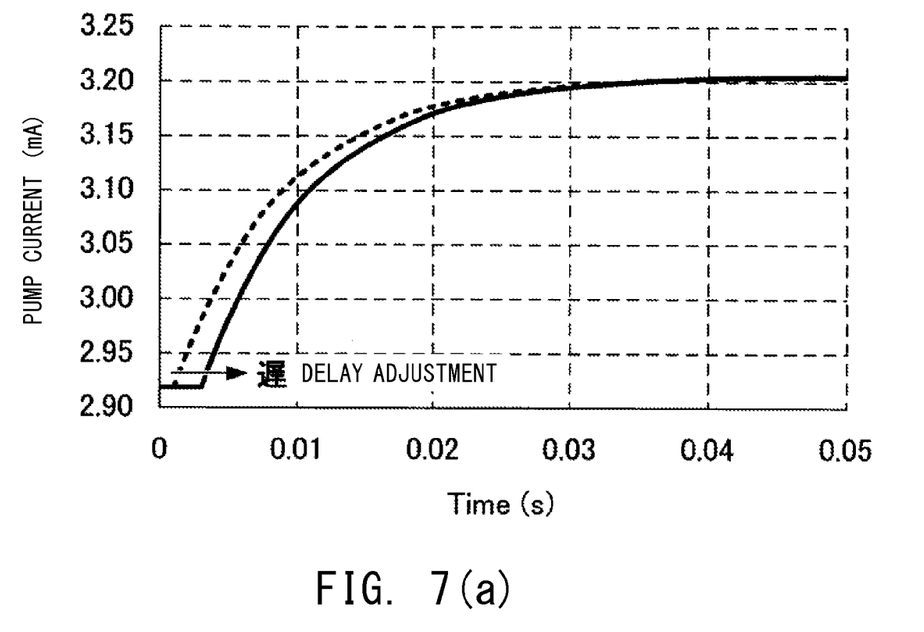
FIGS. 7(a) and 7(b) are graphs showing the waveforms of an adjusted pump current signal Ipadj and an adjusted pressure signal Padj.

The adjusted pump current signal Ipadj generated by adjusting the response rate and delay time of the pump current signal Ip by the first response adjustment section 34 and the first delay adjustment section 35 has a waveform shown in the graph of FIG. 7(a). The adjusted pressure signal Padj generated by adjusting the response rate and delay time of the pressure signal P by the second response adjustment section 36 and the second delay adjustment section 37 has a waveform shown in the graph of FIG. 7(b).

Figure 7B:
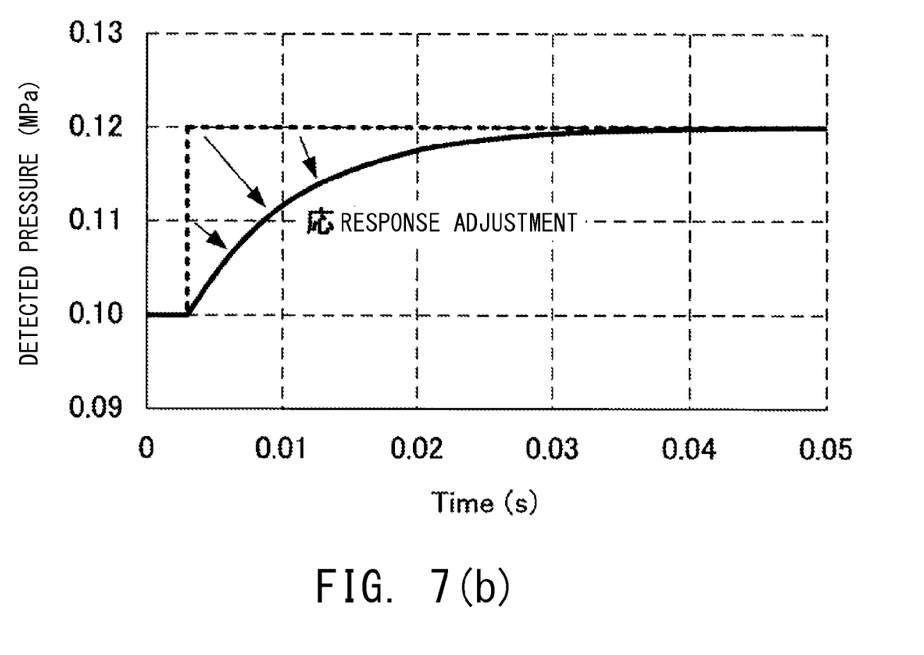

The adjusted pump current signal Ipadj has a delay time adjusted by the first delay adjustment section 35 such that the delay time of the adjusted pump current signal Ipadj becomes substantially the same as that of the pressure signal P. The adjusted pressure signal Padj has a response rate adjusted by the second response adjustment section 36 such that its response rate becomes substantially the same as that of the pump current signal Ip. Notably, neither the response rate adjustment by the first response adjustment section 34 nor the delay time adjustment by the second delay adjustment section 37 is carried out.

Namely, by passing through the first response adjustment section 34, the first delay adjustment section 35, the second response adjustment section 36, and the second delay adjustment section 37, the pump current signal Ip and the pressure signal P, which differ from each other in response rate and delay time, are converted to the adjusted pump current signal Ipadj and the adjusted pressure signal Padj which have substantially the same response rate and delay time.

Figure 8:
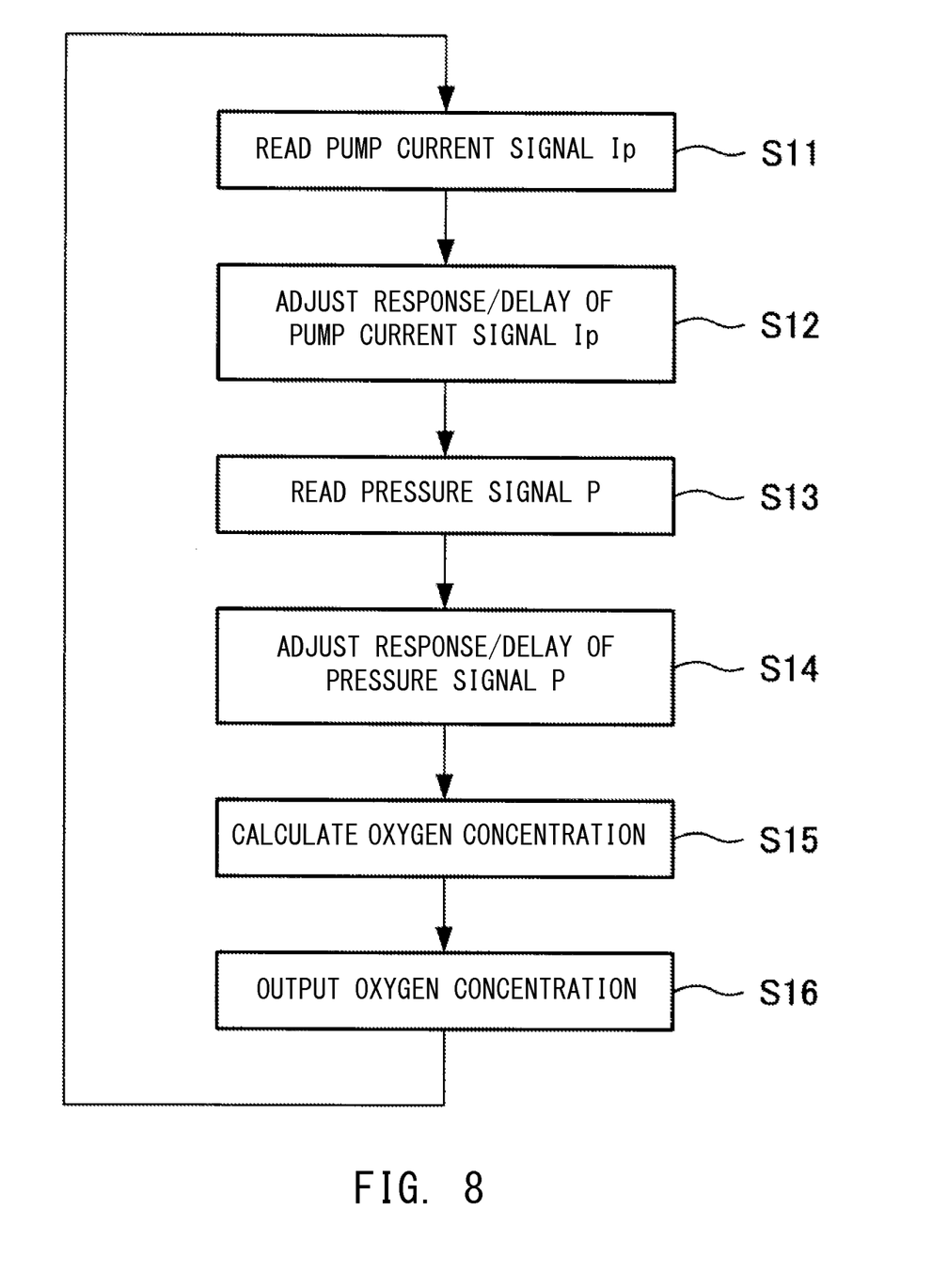
FIG. 8 is a flowchart showing the computation processing routine executed by an MCU.

Next, the method of computing oxygen concentration performed in the sensor control system 1 configured as mentioned above will be described with reference to the flowchart shown in FIG. 8. In the present embodiment, the MCU 33 of the sensor control system 1 is composed of a digital circuit, and the oxygen sensor 10, the pressure sensor 20, the MCU 33, etc., operate in accordance with a predetermined sampling frequency (e.g., 1 kHz).

When power is supplied to the sensor control system 1 and measurement by the oxygen sensor 10 and the pressure sensor 20 starts, the MCU 33 obtains the pump current signal Ip output from the oxygen sensor control/detection circuit 31 and inputs the obtained pump current signal Ip to the first response adjustment section 34 (S11: obtainment step). Next, the MCU 33 adjusts the response rate and delay time of the input pump current signal Ip in the first response adjustment section 34 and the first delay adjustment section 35, respectively, (S12: response adjustment step and delay adjustment step). The adjustment made in step S12 can be represented by the following Expression (1).

$$Ip_{adj} = \frac{1 - C_{IIR}}{1 - C_{IIR} \cdot Z^{-1}} \cdot Ip \cdot Z^{-n} \quad (1)$$

Also, the MCU 33 obtains the pressure signal P output from the pressure sensor control/detection circuit 32 and inputs it to the second response adjustment section 36 (S13: obtainment step). Next, the MCU 33 adjusts the response rate and delay time of the input pressure signal P in the second response adjustment section 36 and the second delay adjustment section 37, respectively, (S14: response adjustment step and delay adjustment step). The adjustment made in step S14 can be represented by the following Expression (2).

$$P_{adj} = \frac{1 - C_{IIR}}{1 - C_{IIR} \cdot Z^{-1}} \cdot P \cdot Z^{-n} \quad (2)$$

Each of the above-described response rates is adjusted by selecting the value of the coefficient $C_{IIR}$ contained in the term of Expressions (1) and (2) which is given below. For example, a desired value is selected from a plurality of values such as 0.73, 0.83, 0.88, 0.91, and 0.93. Notably, a desired value may be selected from other values in order to improve the accuracy of the above-described adjustment.

$$\frac{1 - C_{IIR}}{1 - C_{IIR} \cdot Z^{-1}}$$

Each of the above-described delay time is adjusted by selecting the value of the coefficient n of $Z^{-n}$ of Expressions (1) and (2). Notably, n is a natural number, and $z^{-n}$ represents a signal which has been input to MCU 33 (more specifically, the first delay adjustment section 35 or the second delay adjustment section 37) n sampling cycles before and which has been delayed in being output.

Upon completing computation of the adjusted pump current signal Ipadj in step S12 and computation of the adjusted pressure signal Padj in step S14, the computation section 38 of the MCU 33 obtains, through computation, the oxygen concentration based on the Expression (3) given below (S15: computation step). Notably, the oxygen concentration is obtained by substituting the adjusted pump current signal Ipadj and the adjusted pressure signal Padj into the Expression (3) derived from Fick's law.

$$\text{Oxygen concentration} = 1 - \exp\left[-A \cdot Ip_{adj} \cdot \frac{B + P_{adj}}{P_{adj}}\right] \quad (3)$$

Notably, A and B are constants used for computing the approximate value of the oxygen concentration. A is a constant determined by the following Expression (4), and B is a constant determined by the following Expression (5).

$$A = \frac{LR}{4SFkT^{0.75}} \quad (4)$$

$$B = \frac{k}{k'}T^{1.25} \quad (5)$$

Notably, L is the length (m) of a diffusion hole of the oxygen sensor 10; R is the gas constant (8.314 $JK^{-1}$ $mol^{-1}$); S is the cross-sectional area (m²) of the diffusion hole of the oxygen sensor 10; F is the Faraday constant (9.6485×10⁴ $Cmol^{-1}$); and T is the temperature (K) of the gas passing through the diffusion hole of the oxygen sensor 10.

Notably, the above-described coefficients A and B may be calculated from the above-described Expressions (4) and (5), respectively, or they may be empirically obtained by measuring the oxygen concentration of a gas whose oxygen concentration and pressure are known. No limitation is imposed on the method of obtaining the coefficients A and B.

The above-described Expression (3) is obtained as follows. Expression (7) given below is derived from Expression (6) (i.e., Fick's law) given below. Expression (8) representing a diffusion coefficient $D_{AB}$, which is obtained by combining a molecular diffusion coefficient $D_m(=kT^{1.75}/P)$ and a Knudsen diffusion coefficient $Dk(=k'T^{0.5})$, is substituted into Expression (7), from which Expression (9) is obtained through rearrangement. Expression (3) is obtained from Expression (9).

$$\dot{c}_A - w_A \dot{c} = -cD_{AB}\frac{\partial w_A}{\partial y} \quad (6)$$

$$I = -\frac{4SFD_{AB}P}{LRT}\ln\left[1 - \frac{P_A}{P}\right] \quad (7)$$

In Expression (6), $c_A$ over which a dot (•) is placed is the molar mass velocity(=$c_A v_A$) of a component A; $w_A$ is the mole fraction(=$c_A/c$) of the component A; c over which a dot (•) is placed is the molar mass velocity(=cv); and c is the molar concentration (kmol/m³). In addition, $P_A$ is the partial pressure (k$P_a$) of the component A; P is the pressure (kPa) of the gas; and $P_A/P$ is the concentration (%) of the component A.

$$\frac{1}{D_{AB}} = \frac{1}{D_m} + \frac{1}{D_k} \quad (8)$$

$$D_{AB} = \frac{kk'T^{2.25}}{kT^{1.75} + k'T^{0.5}P}$$

$$I = -\frac{4SFP}{LRT}\frac{kk'T^{2.25}}{kT^{1.75} + k'T^{0.5}P}\ln\left[1 - \frac{P_A}{P}\right] \quad (9)$$

$$\ln\left[1 - \frac{P_A}{P}\right] = A \cdot I \cdot \frac{B + P}{P}$$

$$\frac{P_A}{P} = 1 - e^{\left[-A \cdot I \cdot \frac{B+P}{P}\right]}$$

Upon obtaining the oxygen concentration in step S15 as described above, the MCU 33 outputs the obtained oxygen concentration (S16) to the control section (unillustrated) which is included in the ECU 30 and which controls the internal combustion engine 40 based on the oxygen concentration. Next, the MCU 33 returns to step S11, whereby it repeatedly executes the above-described steps at a predetermined sampling frequency.

Next, with reference to FIG. 9, an example will be described in which the sensor control system 1 configured as described above computes the oxygen concentration. Here, a case will be described where the oxygen sensor 10, the pressure sensor 20, the MCU 33, etc. operate in accordance with the sampling frequency of 1 kHz, the coefficient $C_{IIR}$=0.88 and n=0 in step S12, and the coefficient $C_{IIR}$=0 and n=2 in step S14.

Figure 9A:
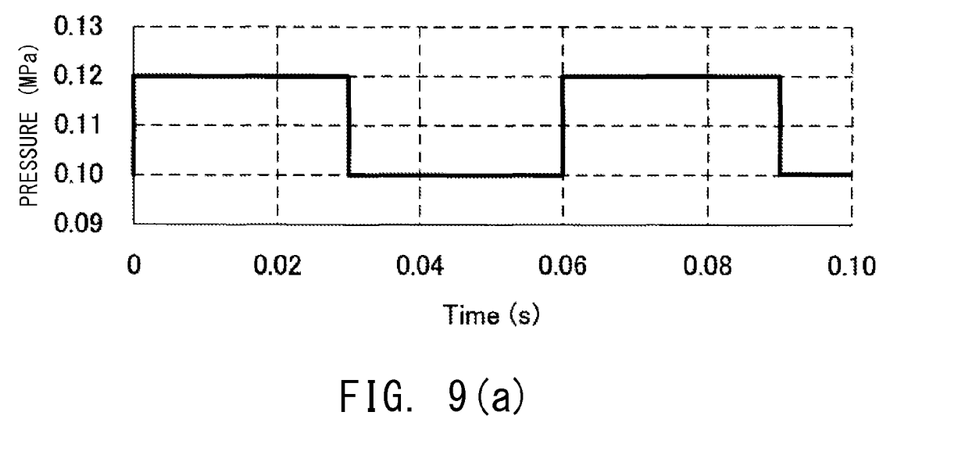
FIGS. 9(a) and 9(b) are graphs showing the effect of the response adjustment and delay adjustment according to the present embodiment.

As shown in FIG. 9(a), the pressure of the intake gas sharply changes between 0.10 MPa and 0.12 MPa in a repeated and stepwise fashion. In addition, the oxygen concentration of the intake gas is adjusted to 16 vol %.

Figure 9B:
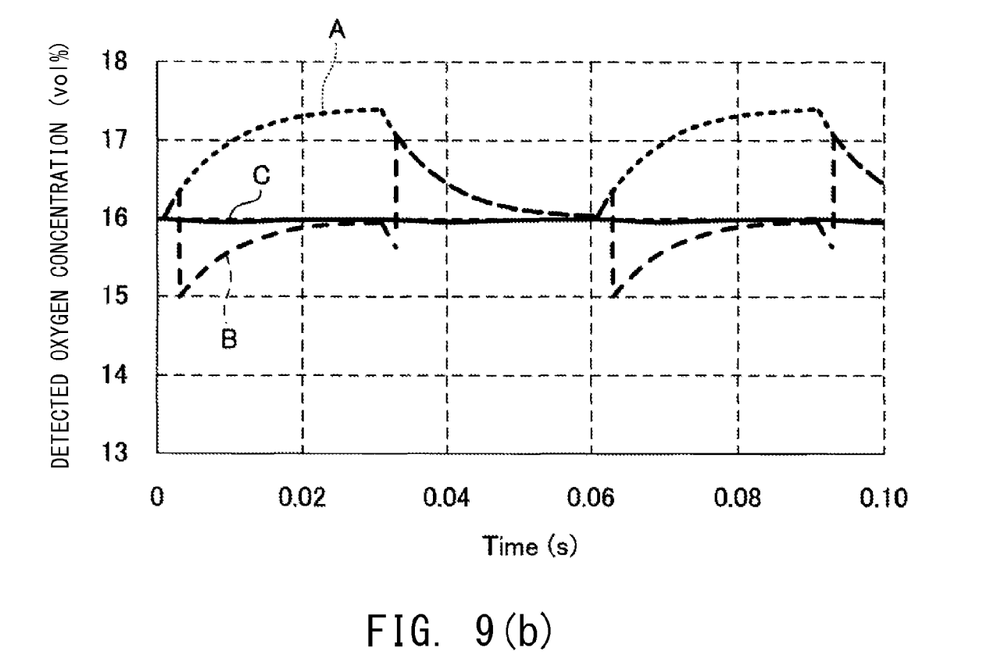

In the case where the pressure of the intake gas changes as shown in FIG. 9(a), the computed oxygen concentration changes as shown in the graph of FIG. 9(b). In FIG. 9(b), the broken line A represents a change in the oxygen concentration computed without being corrected based on pressure (in other words, without performing pressure-based correction); the broken line B represents a change in the oxygen concentration computed by performing the pressure-based correction without performing the response adjustment and the delay adjustment; and the solid line C represents a change in the oxygen concentration computed by performing the pressure-based correction, the response adjustment, and the delay adjustment (i.e., a change in the oxygen concentration according to the present embodiment).

As shown in FIG. 9(b), when the intake gas pressure increases to 0.12 MPa, the value of the oxygen concentration (broken line A) computed without performing the pressure-based correction becomes higher than the actual value of the oxygen concentration (16 vol %). When the intake gas pressure returns to 0.10 MPa, the value of the oxygen concentration (broken line A) gradually changes so as to approach the actual value of the oxygen concentration (16 vol %).

In contrast, when the intake gas pressure increases to 0.12 MPa, the value of the oxygen concentration (broken line B) computed by performing the pressure-based correction but without making the response and delay adjustments approaches the actual value of the oxygen concentration (16 vol %) by virtue of the pressure-based correction although the value of the oxygen concentration greatly changes at first. When the intake gas pressure returns to 0.10 MPa, the value of the oxygen concentration (broken line B) approaches the actual value of the oxygen concentration (16 vol %) by virtue of the pressure-based correction although the value of the oxygen concentration greatly changes at first.

It is also found from FIG. 9(b) that the value of the oxygen concentration (solid line C) computed by performing the pressure-based correction, the response adjustment, and the delay adjustment as in the present embodiment is almost the same as the actual value of the oxygen concentration (16 vol %) irrespective of the change in the intake gas pressure. In other words, in both of the case where the intake gas pressure increases to 0.12 MPa and the case where it returns to 0.10 MPa, the change in the value of the oxygen concentration (solid line C) is significantly suppressed as compared with those represented by the broken lines A and B.

According to the sensor control system 1 and the ECU 30 configured as described above, the first response adjustment section 34 and the second response adjustment section 36 reduce the difference in response rate between the pump current signal Ip and the pressure signal P received by the computation section 38. As a result, it becomes easier to eliminate the influence of a dynamic change in the intake gas pressure on the pump current signal Ip. In general, the oxygen sensor 10 and the pressure sensor 20 often differ from each other in terms of behavior toward a dynamic change in the intake gas pressure (e.g., rates of response of the output signals of these sensors to a change in the intake gas pressure). Therefore, in the case where the output signals of the oxygen sensor 10 and the pressure sensor 20 are directly input to the computation section 38, a situation arises in which the computation section 38 receives from these sensors respective signals whose responses change to different degrees, depending on the change in the intake gas pressure. In such a situation, the computation section 38 cannot perform an appropriate correction (elimination of the influence of the intake gas pressure on the sensor current signal Ip), thereby failing to improve the accuracy in correcting the oxygen concentration.

In contrast, in the present embodiment, the first response adjustment section 34 and the second response adjustment section 36 perform adjustment such that the response rate of the pump current signal Ip or the response rate of the pressure signal P, whichever is faster, approaches the slower of the two, thereby inputting the adjusted pump current signal Ipadj and the adjusted pressure signal Padj to the computation section 38. Namely, the difference in response between the pump current signal Ip and the pressure signal P is reduced. Thus, the computation section 38 can perform an appropriate correction more easily, thereby making it easier to improve the accuracy in correcting the oxygen concentration.

In addition, since the first delay adjustment section 35 and the second delay adjustment section 37 reduce the difference in delay time between the pump current signal Ip and the pressure signal P received by the computation section 38, the computation section 38 can more easily eliminate the influence of the dynamic change in the intake gas pressure on the pump current signal Ip. In general, the oxygen sensor 10 and the pressure sensor 20 often differ from each other in terms of delay time (time between a point at which the intake gas pressure changes and a point at which the corresponding signal begins to respond to the change). Therefore, in the case where the signals of the oxygen sensor 10 and the pressure sensor 20 are directly input to the computation section 38, a situation arises where a signal which has changed in value with the change in the intake gas pressure is input to the computation section 38 along with a signal which has not changed in value with the change in the intake gas pressure. In such a situation, the computation section 38 cannot perform an appropriate correction, thereby failing to improve the accuracy in correcting the oxygen concentration.

In contrast, in the present embodiment, the first delay adjustment section 35 and the second delay adjustment section 37 perform an adjustment such that the delay time of the pump current signal Ip or the delay time of the pressure signal P, whichever is shorter, approach the longer of the two, thereby inputting the adjusted pump current signal Ipadj and the adjusted pressure signal Padj to the computation section 38. Namely, a shortened period during which a signal which has changed in value with a change in intake gas pressure is input to the computation section 38 along with a signal which has not changed in value with the change in the intake gas pressure. As a result, the computation section 38 can perform an appropriate correction more easily, thereby making it easier to improve accuracy in correcting the oxygen concentration.

In the above-described embodiment, the Expression (3) is used to compute the oxygen concentration. However, an expression obtained through Tailor expansion of the exponent part $(-A \cdot I_{padj} \cdot (B+P_{adj})/P_{adj})$ of the above-described Expression (3) may be used to compute the oxygen concentration, and no particular limitation is imposed on the expression used to compute the oxygen concentration.

In the above-described embodiment, the current value Ip of the oxygen sensor 10 is used as the output value thereof. However, no particular limitation is imposed on the output value; for example, a voltage value Vp of the oxygen sensor 10 may be used as the output value. In addition, the gas sensor used in the above-described embodiment is not limited to the oxygen sensor 10, and a gas sensor for detecting the concentration of a specific gas component (e.g., $NO_x$) other than oxygen may be used.

In the above-described embodiment, the response rates of two signals (the sensor output signal Ip and the pressure signal P) are first adjusted, and then their delay times are adjusted. However, no particular limitation is imposed on the order of adjustment, and the embodiment may be modified such that the delay times of the two signals are first adjusted, and then their response rates are adjusted. In addition, since the response rates of the sensor output signal Ip and the pressure signal P are greatly affected by a change in the intake gas pressure as compared with the delay times of these signals, the influence of the intake gas pressure on the sensor output signal Ip can be effectively corrected based on the pressure signal P by adjusting only the response rates of these signals without adjusting the delay times thereof.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2013-066737 filed Mar. 27, 2013, incorporated herein by reference in its entirety.

What is claimed is:

1. A sensor control apparatus including a computation section which receives from a gas sensor a sensor output signal corresponding to the concentration of a specific gas component contained in a gas flowing through a flow passage provided in an internal combustion engine, and a pressure signal output from a pressure sensor which measures the pressure of the gas, the computation section computing a specific component concentration which represents the concentration of the specific gas component and is corrected based on the pressure signal in order to eliminate an influence of the pressure of the gas on the sensor output signal, the sensor control apparatus comprising:

a response adjustment section which adjusts a response rate of at least one of the sensor output signal and the pressure signal before being input to the computation section, the response rate exhibiting a time variation of the corresponding signal to a change in the pressure of the gas, such that the response rate of the sensor output signal or the response rate of the pressure signal, whichever is faster, approaches the slower of the response rate of the sensor output signal and the response rate of the pressure signal; and a delay adjustment section which adjusts a delay time of at least one of the sensor output signal and the pressure signal before being input to the computation section, the delay time being a time between a point at which the pressure of the gas changes and a point at which the corresponding signal begins to respond to the change in the pressure, such that the delay time of the sensor output signal or the delay time of the pressure signal, whichever is shorter, approaches the longer of the delay time of the sensor output signal and the delay time of the pressure signal.

2. A sensor control system comprising:

a gas sensor which outputs an output value corresponding to the concentration of a specific gas component contained in a gas flowing through a flow passage provided in an internal combustion engine;

a pressure sensor which measures the pressure of the gas; and the sensor control apparatus as claimed in claim 1.

3. A sensor control method comprising:

obtaining from a gas sensor a sensor output signal corresponding to the concentration of a specific gas component contained in a gas flowing through a flow passage provided in an internal combustion engine, and a pressure signal output from a pressure sensor which measures the pressure of the gas;

adjusting a response rate of at least one of the sensor output signal and the pressure signal, the response rate exhibiting a time variation of the corresponding signal to a change in the pressure of the gas, such that the response rate of the sensor output signal or the response rate of the pressure signal, whichever is faster, approaches the slower one of the response rate of the sensor output and the response rate of the pressure signal;

computing a specific component concentration which represents the concentration of the specific gas component based on the adjusted sensor output signal and the adjusted pressure signal such that the specific component concentration is corrected based on the pressure signal in order to eliminate an influence of the pressure of the gas on the sensor output signal; and adjusting a delay time of at least one of the sensor output signal and the pressure signal, which adjusting step is performed between the obtaining step and the computing step, the delay time being a time between a point at which the pressure of the gas changes and a point at which the corresponding signal begins to respond to the change in the pressure, such that the delay time of the sensor output signal or the delay time of the pressure signal, whichever is shorter, approaches the longer of the delay time of the sensor output signal and the delay time of the pressure signal.

4. A sensor control apparatus including a computation section which receives from a gas sensor a sensor output signal corresponding to the concentration of a specific gas component contained in a gas flowing through a flow passage provided in an internal combustion engine, and a pressure signal output from a pressure sensor which measures the pressure of the gas, the computation section computing a specific component concentration which represents the concentration of the specific gas component and is corrected based on the pressure signal in order to eliminate an influence of the pressure of the gas on the sensor output signal, the sensor control apparatus comprising:

a first response adjustment section which adjusts a response rate of the sensor output signal to a change in the pressure of the gas before being input to the computation section and a second response adjustment section which adjusts a response rate of the pressure signal to a change in the pressure of the gas before being input to the computation section, such that the response rate of the sensor output signal or the response rate of the pressure signal, whichever is faster, approaches the slower of the response rate of the sensor output signal and the response rate of the pressure signal.

* * * * *